United States Patent
Sofer et al.

(10) Patent No.: US 11,403,577 B2
(45) Date of Patent: Aug. 2, 2022

(54) ASSISTING AND AUTOMATING WORKFLOWS USING STRUCTURED LOG EVENTS

(71) Applicant: International Business Machines Corporation, Armonk, NY (US)

(72) Inventors: Oded Sofer, Midreshet Ben Gurion (IL); Oded Margalit, Ramat Gan (IL); Yair Allouche, Dvira (IL)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 16/789,884

(22) Filed: Feb. 13, 2020

(65) Prior Publication Data
US 2021/0256433 A1    Aug. 19, 2021

(51) Int. Cl.
| G06Q 10/06 | (2012.01) |
| G06F 16/2452 | (2019.01) |
| G06F 16/28 | (2019.01) |
| G06F 16/248 | (2019.01) |
| G06F 16/242 | (2019.01) |

(52) U.S. Cl.
CPC ....... *G06Q 10/0633* (2013.01); *G06F 16/248* (2019.01); *G06F 16/2428* (2019.01); *G06F 16/24522* (2019.01); *G06F 16/285* (2019.01)

(58) Field of Classification Search
USPC ...................................................... 705/7.27
See application file for complete search history.

(56) References Cited

U.S. PATENT DOCUMENTS

| 7,761,393 | B2 | 7/2010 | Macbeth et al. |
| 7,809,822 | B2 | 10/2010 | Gotta et al. |
| 8,312,322 | B2 | 11/2012 | Gururaj |
| 8,621,637 | B2 | 12/2013 | Al-Harbi et al. |
| 10,467,635 | B1 * | 11/2019 | Kapoor ............... G06F 16/2322 |
| 10,554,817 | B1 * | 2/2020 | Sullivan ................ G06N 5/02 |
| 2003/0233374 | A1 * | 12/2003 | Spinola ............... G06Q 10/08 |
| 2008/0222734 | A1 * | 9/2008 | Redlich ................ H04L 63/02 |
|  |  |  | 726/26 |
| 2015/0220308 | A1 * | 8/2015 | Condon ................ G06F 8/20 |
|  |  |  | 717/104 |

(Continued)

FOREIGN PATENT DOCUMENTS

| CN | 102332125 B | 3/2014 |
| CN | 103218692 B | 3/2017 |
| CN | 107909344 B | 7/2020 |

OTHER PUBLICATIONS

Khalid et al "A flexible workflow model for process-oriented applications", Dec. 2002, IEEE, pp. 72-80 (Year: 2002).*

(Continued)

*Primary Examiner* — Romain Jeanty
(74) *Attorney, Agent, or Firm* — Barry D. Blount

(57) ABSTRACT

An example system includes a processor to monitor a user interface to generate activity logs including step-flows. The processor is to extract features and common variables from unstructured data in the activity logs and generate structured log events based on the extracted features and the common variables. The processor is to generate a workflow model based on the structured log events. The processor is to automate or assist workflow based on the generated workflow model.

20 Claims, 7 Drawing Sheets

(56) References Cited

U.S. PATENT DOCUMENTS

| | | | |
|---|---|---|---|
| 2016/0188477 A1* | 6/2016 | Choi | G06F 12/0862 |
| | | | 711/137 |
| 2016/0189203 A1* | 6/2016 | Rajab | G06Q 30/0244 |
| | | | 705/14.43 |
| 2017/0017903 A1* | 1/2017 | Gray | G06F 3/14 |
| 2017/0344926 A1 | 11/2017 | Chakra et al. | |
| 2018/0089602 A1* | 3/2018 | Elvira | G06Q 10/0633 |
| 2018/0107529 A1 | 4/2018 | Anchuri et al. | |
| 2019/0149319 A1* | 5/2019 | Chabanne | H04L 9/0643 |
| | | | 713/189 |

OTHER PUBLICATIONS

International Search Report and Written Opinion of the International Searching Authority dated Apr. 9, 2021, Application No. PCT/IB2020/062537, 7 Pages.

Brunner, Michael, "RiskFlows—Continuous Risk-driven Workflows and Decision Support in Information Security Management Systems," University of Innsbruck, Institute of Computer Science Research Group Quality Engineering. 9 pages.

\* cited by examiner

US 11,403,577 B2

ASSISTING AND AUTOMATING WORKFLOWS USING STRUCTURED LOG EVENTS

BACKGROUND

The present techniques relate to workflows. More specifically, the techniques relate to automation of workflows.

SUMMARY

According to an embodiment described herein, a system can include processor to monitor a user interface to generate activity logs comprising step-flows. The processor can also further extract features and common variables from unstructured data in the activity logs and generate structured log events based on the extracted features and the common variables. The processor can also generate workflow models based on the structured log events. The processor can also further automate or assist a workflow based on the generated workflow models.

According to another embodiment described herein, a method can include monitoring, via a processor, a user interface to generate activity logs comprising step-flows. The method can further include extracting, via the processor, features and common variables from unstructured data in the activity logs and generate structured log events based on the extracted features and the common variables. The method can also further include generating, via the processor, a workflow model based on the structured log events. The method can also include automating or assisting, via the processor, a workflow based on the generated workflow model.

According to another embodiment described herein, a computer program product for automating or assisting workflows can include computer-readable storage medium having program code embodied therewith. The computer readable storage medium is not a transitory signal per se. The program code executable by a processor to cause the processor to monitor a user interface to generate activity logs comprising step-flows. The program code can also cause the processor to extract features and common variables from unstructured data in the activity logs and generate structured log events based on the extracted features and the common variables. The program code can also cause the processor to generate a workflow model based on the structured log events. The program code can also cause the processor to automate or assist a workflow based on the generated workflow model.

DETAILED DESCRIPTION

Security operations are very expensive and limited. Reviewing and investigating every suspected event in a security investigation is infeasible, while each of these events might indicate a security incident with sever implication on a targeted organization. In addition, brainstorming and process planning for every suspicious event may be cost prohibitive. Moreover, there may be thousands of such processes running at a given time.

Some automated event investigation solutions are built in advance. For example, security experts can design "out-of-the-box" recipes for automated event investigation. However, these approaches are highly limited and may not meet the challenging cyber security landscape of today. For example, the fast and dynamic creativity of an attacker may prevent detection. In addition, frequent changes to technology may quickly render such a design ineffective. Moreover, a lack of domain expertise from the vendor may make such design ineffective from the beginning. Finally, company-specific cases may not work well in other situations. For example, an attacker may take advantage of vulnerability that is specific to a customer. There may also be cases where a specific customer has a specific architecture, configuration, or code and the processes the vendor is releasing may not cover those cases. In addition, for attacks that may not have a signature, there may not be any simple way to automatically build efficient mechanisms to remediate such attacks.

According to embodiments of the present disclosure, a system can use structured log events in order to automatically assist or automate workflows. An example system includes a processor to monitor a user interface to generate activity logs including step-flows. The processor is to extract features and common variables from unstructured data in the activity logs and generate structured log events based on the extracted features and the common variables. The processor is to generate workflow models based on the structured log events. The processor is to automate or assist workflow based on the generated workflow models. Thus, embodiments of the present disclosure enable automation or assisted workflow support based on model workflows generated from monitored activity of users.

Figure 1:
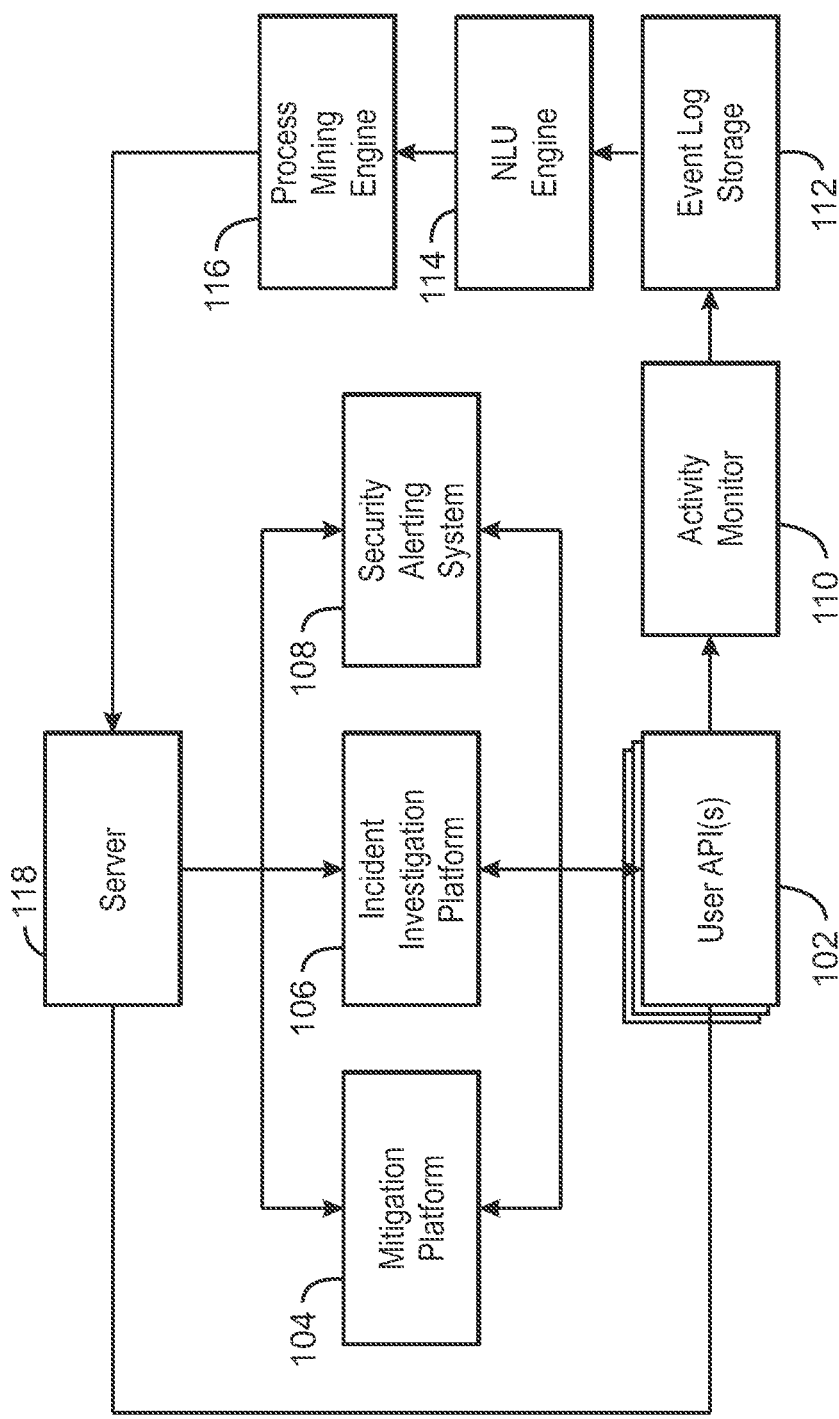
FIG. 1 is a block diagram of an example system for automating and assisting workflows using structured log events.

With reference now to FIG. 1, a block diagram shows an example system for automating and assisting workflows using structured log events. The example system is generally referred to by the reference number 100 and can be implemented using the computing device 400 or the computer-readable media 500 of FIGS. 4 and 5 using the methods 200 and 300 of FIGS. 2 and 3.

In the example of FIG. 1, the system 100 includes a number of user application programming interfaces (APIs) 102. The system 100 also includes a mitigation platform 104, an incident investigation platform 106, and a security alerting system 108 communicatively coupled to the user APIs 102. The system 100 further includes an activity monitor 110 communicatively coupled to the user APIs 102. The system 100 also further includes an event log storage 112 communicatively coupled to the activity monitor 110. The system 100 also includes a natural language understanding (NLU) engine communicatively coupled to the event log storage 112. The system 100 also further includes a process mining engine 116 communicatively coupled to the NLU engine 114. The system 100 also includes a server 118 communicatively coupled to the process mining engine 116, the user APIs 102, and the incident investigation platform 106.

Still referring to FIG. 1, the system 100 may be used for automating a security best-practice builder, a forensic process, system tuning, and risk mitigation processes by leveraging the knowledge and proficiency of domain experts. In particular, the system 100 uses a combination of NLU and process mining to construct workflows used by domain experts when conducting these processes. The system 100 can then utilize the construct workflows in order to assist the users when applying theses process. For example, the system 100 can suggest mitigation measures for incoming suspicious events, including information to support such mitigation measures. The system 100 can also utilize the construct workflows in order to automate event investigation, system tuning, and risk mitigation processes.

In the example of FIG. 1, the system 100 includes user APIs 102 used by domain experts to apply an investigation procedure. As one example, a domain expert may be a system-on-chip (SoC) analyst. In various examples, these user APIs 102 can range from a simple interface for applying simple SQL queries up to a NLU-based UI that enables questioning the system and getting answers in free language. For example, the user APIs 102 may implement a chatBot with advanced NLU technology to simplify the work needed to investigate every suspicious event. In some examples, chats with the users may be converted to a Rest API for querying the data, which may be used to set basic transition rules. As used herein, a transition rule includes one or more conditions for a step of a process to move to another step. For example, a user may ask the system to check if a suspicious user failed to login more than N times in the Last 3 Days. The user may specify "if Yes, then take step A" and "if No, then take step B." Thus, the transition rule in this example is based on number of Failed Logins in the Last 3 days and is used by the system 100 to determine the next step. In various examples, the data from the chats with users may also be used for executing various actions. For example, the actions may include to block access for the suspicious user for the next N hours. In some examples, the actions may include sending a notification to a manager of the suspicious user. In various examples, the actions may include increasing a resolution of auditing for the suspicious user. In some examples, the actions may include logging the actions of the suspicious user to a Violation System. In some examples, the actions may include opening a ticket. For example, the ticket may be used to flag the actions of the suspicious user for manual review. In various examples, the actions may include closing the case in response to detecting the detection of a suspicious user was a false positive.

The security alerting system 108 can generate a security alert in response to a detection of a security event. For example, the security event may be detected via a data firewall, an intrusion detection system (IDS), a security information and event management (SIEM) system, or other suitable technique for security event detection. In some examples, the security alerting system 108 may include multiple security alerting systems.

The incident investigation platform 106 can be used to investigate security incidents. For example, the security incidents may be received from a SIEM, a malware analysis engine, a data base activity analysis engine, etc. In various examples, the incident investigation platform 106 includes a search engine that allows users to query internal and external databases.

The mitigation platform 104 can be used to apply configuration tuning and mitigation command on the organization's security systems. For example, the mitigation platform 104 can be used to add an internet protocol (IP) address to a firewall black list. As another example, the mitigation platform 104 can revoke user credentials for a certain service.

The activity monitor 110 can monitor domain expert interaction with one or more systems and generate log activities containing step-flows performed by the domain expert. In various examples, the monitoring of the activity monitor 110 can be either on the client side or on the server side. In some examples, in order to gain the most comprehensive record of a monitored procedure, the activity monitor 110 can monitor all the domain expert activity during a process. Therefore, in some examples, the activity monitor 110 can also monitor queries applied on external platforms. For example, the activity monitor 110 can monitor queries on web platforms. In addition, in some examples, activity monitor 110 can perform passive monitoring or active monitoring. For example, passive monitoring may be transparent to a user, such as a domain expert. In active monitoring, the activity monitor 110 can interact with the user in order gain insight about a particular workflow. For example, the activity monitor 110 can ask a user to highlight a part in some response that led to the next step in the investigation procedure. In various examples, the activity monitor 110 can apply proactive monitoring asking the user help to determine the transition rule and to populate a token in order to improve the process mining. As used herein, a token refers to a list of parameters and parameter values that may be used in subsequent steps and thus stored. For example, the parameter values may be used as run time parameter values in subsequent steps of a process. Thus, a token may serve as a context for subsequent steps. In various examples, the activity monitor 110 can allow the user to highlight the artifacts in a system response that led to the following query or led to the incident conclusion.

In various examples, the event log storage 112 is a database used to store the activity logs produce by the activity monitor 110. For example, the event log storage 112 can be an internal or an external database.

The NLU engine 114 may be a model used to extract features and common variables from unstructured data in activity logs. For example, the features may be users, files, or other features of a monitored system. The NLU engine 114 can convert the unstructured data to a structured log event that can be processed by the process mining engine 116. Variables may be specific error types, times, etc. In various examples, the NLU engine 114 may store the structured log events in a database, such as the event log storage 112.

The process mining engine 116 may receive domain expert logs from the event log storage 112 and construct workflow models based on the domain expert logs. In order to construct the workflow models, the process mining engine 116 may execute a process mining procedure. The process mining procedure may be implemented using the method 300 of FIG. 3. For example, in the processing mining procedure, the process mining engine 116 may convert the process to start→step-flow→end. The process mining engine 116 can identify a common "starting-step." For example, the common starting step may be a common starting suspicious event that started multiple investigations.

In various examples, a starting step may be used to run the process mining engine 116 to consolidate and optimize those processes associated with the starting step. The process mining engine 116 can then identify the common "sub-processes" among all the processes. The process mining engine 116 can further identify the transition rules of every process. For example, the process mining engine 116 can set predefined syntax for identifying the transition rules of every process. In various examples, the process mining engine 116 can then execute a classification to identify the context of the step. The context of a step may also be referred to as a token. For the purpose of classification, the process mining engine 116 can learn what parts are variable and where to extract the variable from. Since learning what parts are variable and where to extract variables may be very complex, in some examples the process mining engine 116 can present options to the user and thus allow for manual selection or adjustment of the variables. As one example, if a suspicious event relates to a specific database table, the first step may alert on symptoms related to this database table. The next step may run a first investigation step with respect to this database. The classification objective may be to identify an <entity: value> pair such that the automation will know to set <table:"table name"> as a running-parameter and not as constant. The process mining engine 116 can then create an optimized flow. For example, the process mining engine 116 may take into consideration the starting events, transition-rules, and the common sub-processes in creating optimized flows. In various examples, optimization of a flow may be done within users of a same company and even across multiple companies. In some examples, the process mining engine 116 can then adjust the workflow model by allowing the user to custom and enhance the produces workflow model. In various examples, the outcome of the process mining procedure is an automated optimal and consolidated process flow automatically generated based on NLU. In some examples, the resulting optimal and consolidated process flow may be shared among many customers.

In various examples, the server 118 may include a model that receives as an input the constructed work flows and uses the constructed workflows to either assist the user to apply the event investigation procedure or to automate, either wholly or in part, the investigation procedure. In some examples, an automated process can be triggered by an incident detected by one of the organizations' alerting systems or can be triggered periodically. For example, a user can record a threat analysis process as Ex2 and schedule the threat analysis process to run automatically every N hours. In various examples, the server 118 may also include a classification algorithm to identify entities from the script and then lookup the token for a value to use for a run time parameter of the process. In some examples, the process is defined automatically with its transition-rules and token. For example, the server 108 may identify that the user is to be included in a token to be generated dynamically from the first step and used throughout all the subsequent steps. Additional parameter values may be added to the token in later steps to be used in subsequent steps.

In various examples, assuming that a user continues to run more and more processes, the process mining engine 116 can run periodically to identify more processes for the same Start event, and common sub-processes. The process mining engine 116 can run a specific process mining algorithm to optimize many workflow processes into an optimized process. For example, the process mining engine 116 can run a phase-mining algorithm. The process mining engine 116 can identify and optimize the process with all possible transition-rules. As one example, in the case of a first process in which the user runs an outlier related to COMMAND=GRANT, and sometime later, the same user or another user runs a similar process to the threat analysis process Ex2 above for COMMAND=SELECT, then the two processes may be combined into one optimized process with a transition-rule.

In this manner, the server 118 may not only apply the most fitting optimized process, but can also apply other processes that were not used by a for a given incident. In various examples, the server 118 includes user interface that facilitates iteration between the server and the security expert. For example, the user interface may present suggestions for a security analyst, or provide the security analyst feedback on the automation process, etc. In various examples, the server 118 can cluster cross-customers and recommend every customer an improvement for their process. For example, the customers can be clustered by executing a Nearest Neighbors algorithm. In some examples, the server 118 can interactively execute a predictive-analytic to suggest the next step to a user-manual-process.

As one process example Ex1, a new command outlier "GRANT" may have been detected. A security analyst may send the request: find the user with top outlier of category "New Command." The system may respond by displaying this user and provide details about this outlier command. The outcome is processed by the NLU engine 114 to extract the features to a token. For example, these features may be used in the analysis of subsequent steps and for finding common features to the steps. The NLU engine 114 may have identified a category="New Command" and a user=<user found>. These two dynamic parameters may be copied to the token for later use. The security analyst may then request: If the outlier for this user is New Command of type GRANT then check if the GRANTEE was a DORMANT USER. The system may respond "True, this user is a dormant user" and may provide information about the GRANT command that was detected, among other information. The NLU engine 114 may then execute a feature mapping, execute a relevant API, map the token to the run-time-parameters, and add the command=GRANT & grantee=<user who received the privilege> to the token. The security analyst may then request: Get the GRANTEE and search the Activities of the GRANTEE. The system may respond with "the GRANTEE is John Smith" and provide a list activities of the user John Smith. At this time, the NLU engine 114 may accordingly add <user=John Smith> & activities=<list of activities found> to the token. The security analyst may further request: Check if there is Sensitive Object ((RestAPi to run free-text search with filter <GRANTEE> and <sensitiveObject>)). The system may respond with "8 records found . . . " and provide search results. The NLU engine 114 may accordingly add the sensitiveObject=<list of objects found) to the token. The security analyst might then request "Check if there are more than 1 occurrences of this activities (RestAPi to run free-text search with filter Count >1)." The system may reply with "False." The security analyst may then further request: Check if the number of RECORD AFFECTED is greater than 1 (RestAPi to run free-text search with filter RecordsAffected>1 and Count>1). The system may respond: "True, the number of RECORD AFFECTED is 6" and provide search results. At this time, the NLU engine 114 may add the parameter recordsAffected=6 to the token. Then, the security analyst may send the commands: "Add this USER to the WATCH LIST (RestAPI to add <user> to WatchList)" and "Open a TICKET in ServiceNow and assign to the user's manager (RestAPI to open a TICKET in ServiceNow, the output script of this process is added as a text to the Ticket)." The NLU engine 114 may accordingly add the ServiceNow.ticketId to the token.

In a second example process (Ex2), a new command outlier "SELECT" may be detected. For example, the security analyst may request: Find me the user with top outlier of category "New Command." The system may respond by displaying this user and providing details about this Outlier. The security analyst may then request: "retrieve the outliers where the New Command is SELECT." The system may respond with a list of outliers where the New Command is SELECT. The security analyst may request: "Run generic Search for this USER and look for words OUT_FILE, UTL_HTTP." The system may respond: "True" and provide search results. The security analyst may then send the commands: "Open a ticket for this user," "set priority HIGH SEVERITY," and "text the user name found and export into a file or http."

For these two example processes, the process mining engine 116 may receive two corresponding workflows (WF) from the NLU engine 114 and detect that the two workflows have a common Starting Point. The process mining engine 116 may then run the algorithm to find the optimal workflow to combine the two workflows. In some examples, the algorithm of the process mining engine 116 may create a new workflow that start from step 1, which is common to both workflows, and then a nested workflow to cover the two use-cases.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

Figure 2:
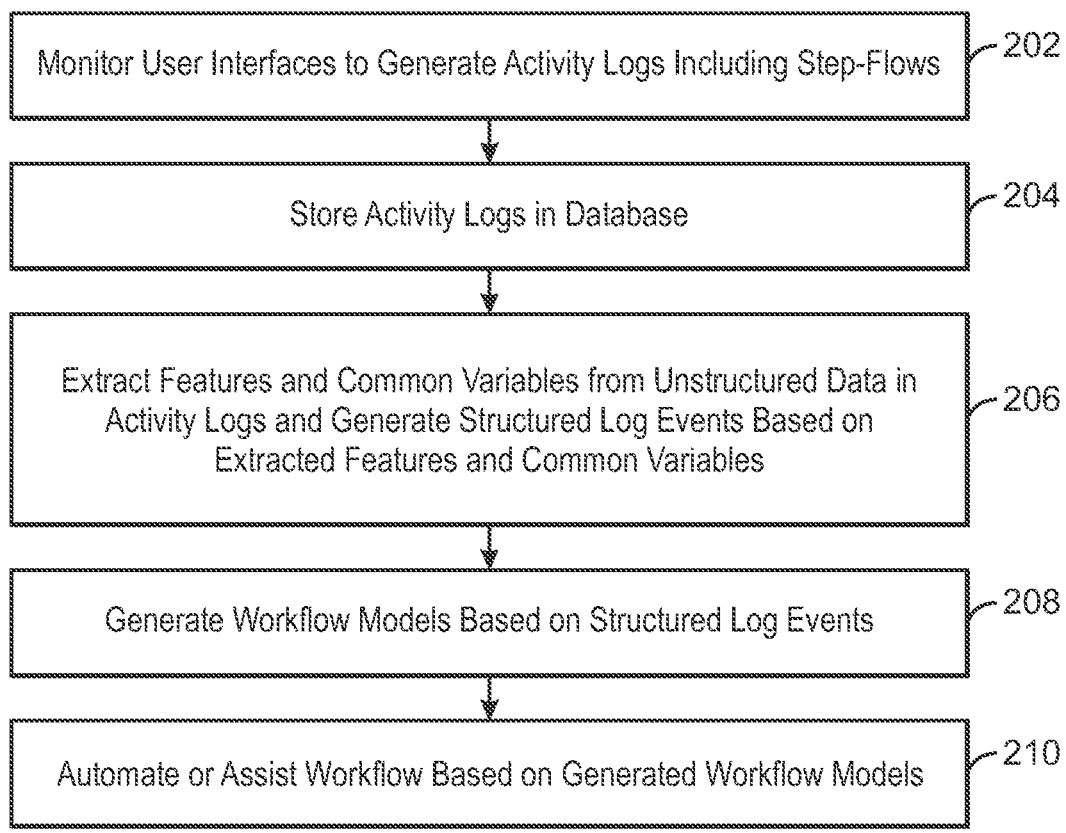
FIG. 2 is a block diagram of an example method that can automate and assist workflows using structured log events.

FIG. 2 is a process flow diagram of an example method that can automate and assist workflows using structured log events. The method 200 can be implemented with any suitable computing device, such as the computing device 300 of FIG. 3 and is described with reference to the system 100 of FIG. 1. For example, the methods described below can be implemented by the computing device 400 of FIG. 4.

At block 202, a processor monitors user interfaces to generate activity logs including step-flows. For example, the processor may monitor a two way conversation between a user and a service on a server. For example, the service may be a chatbot accessed via a virtual assistant, website, or application. The chatbot can conduct conversations with users via auditory or textual techniques. In various examples, the user may send requests to the service as part of a security workflow, a forensic process, a system tuning, or a risk mitigation process. In some examples, the monitoring may be passive monitoring or active monitoring.

At block 204, the processor stores the activity logs in a database. For example, the database may be an internal database directly accessible to the processor or an external database that can be accessed via a network.

At block 206, the processor extracts features and common variables from unstructured data in the activity logs and generates structured log events based on the extracted features and the common variables. For example, the processor can extract the features and common variables using a trained natural language understanding model. In various examples, the extracted features may be stored on a token. In various examples, the extracted features may include user, servers, services, times, commands, tables, fields, response times, records affected, client internet protocol addresses, error types, error codes, violation types, violation severities, among other types of features.

At block 208, the processor generates workflow models based on the structured log events. For example, the processor may generate an optimized workflow model for various types of workflows. In some examples, the processor can generate multiple workflow models for a type of workflow. For example, the workflow models may integrate different processes, including processes or sub-processes that may not have actually been used for a particular task. In some examples, the processor can cluster cross-customers and generate an improved workflow to be recommend to each customer in the cluster. For example, the processor can process mine multiple workflows for a specific customer or across multiple customers, sharing data and learning across multiple customers.

At block 210, the processor automates or assists a workflow based on the generated workflow models. In some examples, the processor can automatically execute a particular generated workflow model. For example, the processor can execute a workflow model optimized for a particular task. In some examples, the processor can execute multiple workflow models for a particular task and present the results to a user. For example, the processor may have generated additional workflow models based on the structured log events and automatically execute the additional workflow models to generate a number of results to be presented. In various examples, the processor can assist a user performing a particular task based on an optimized workflow. For example, the processor may detect that a user is at a particular step of a task and suggest a subsequent step to perform. In various examples, the processor can interactively execute a predictive-analytic to suggest a next step for a user-manual-process. In some examples, the automation of the workflow may be triggered by a detected incident from an alerting system. In various examples, the automation of the workflow may be performed periodically. For example, an automated workflow may be scheduled to be performed automatically at a predefined interval of time.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
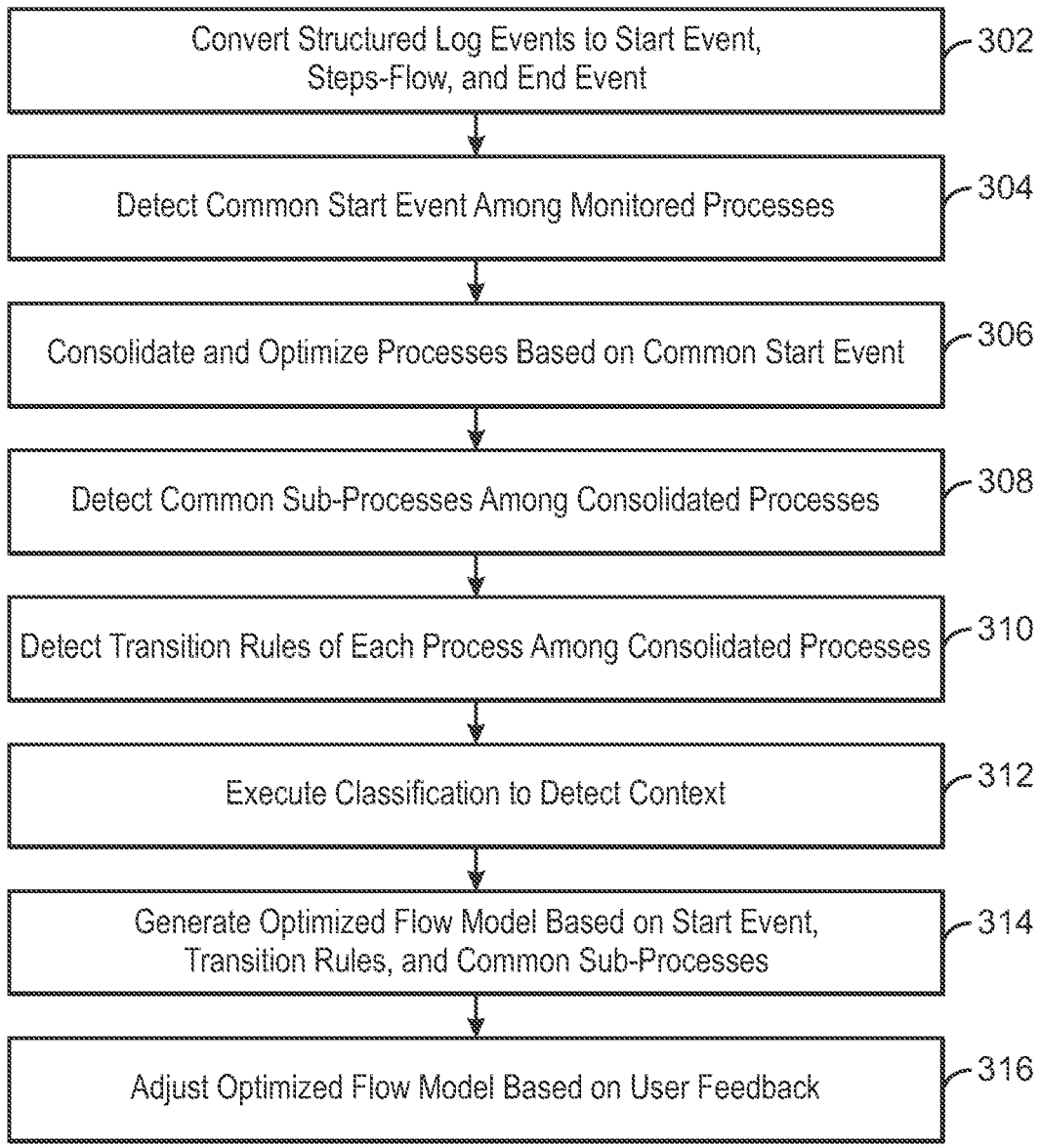
FIG. 3 is a block diagram of an example method that can generate a workflow model for automating or assisting a workflow.

FIG. 3 is a process flow diagram of an example method that can generate a workflow model for automating or assisting a workflow. The method 300 can be implemented with any suitable computing device, such as the computing device 300 of FIG. 3 and is described with reference to the system 100 of FIG. 1. For example, the method 300 can be implemented by the process mining engine 116 of FIG. 1, the process miner module 430 of the computing device 400 of FIG. 4, or the process miner module 712 of FIG. 7.

At block 302, a processor converts the structured log events to a start event, a step-flow, and an end event. A starting event is an event that starts a particular monitored process. For example, a start event may be a suspicious event that starts an investigation. A step-flow may include a series of steps connecting a start event to an end event. An end event may include an event that causes a particular monitored process to end.

At block 304, the processor detects a common start event among monitored processes. For example, the processor can detect the common start event based on one or more features shared by the start events of two or more processes. As one example, two workflow processes may start from a step that includes the command "Get me the top anomaly in last N days."

At block 306, the processor consolidates and optimizes the processes based on the common start event. For example, the processor may consolidate the processes by merging two processes into one optimized process. As one example, the processor can consolidate two start steps. The processor can optimize the processes by any suitable process mining technique.

At block 308, the processor detects common sub-processes among different processes. For example, the common sub-processes may be detected based on shared starting steps, features, variables, etc.

At block 310, the processor detects transition rules of each process among the consolidated processes. In some examples, the processor can set a predefined syntax to detect transition rules. The predefined syntax may be a dictionary or set of examples used by the processor to associate various words or phrases with particular features or variables.

At block 312, the processor runs a classification to detect a context for each step of each process. For example, the processor can use a classifier trained to identify parts of each step in each process that are variable and the locations of such variables. The processor can extract variable parameters into a token. The token can be used to track the extracted parameters across the steps of each process.

At block 314, the processor generates an optimized flow model based on the starting event, the transition rules, the common sub-processes, and the context. In some examples, the optimized flow model may be generated for each user of a particular organization. In various examples, the optimized flow model may be generated for the particular organization. In some examples, the processor may generate an optimized flow model that can be used by multiple organizations.

At block 316, the processor adjusts the optimized flow model based on user feedback. For example, the processor can allow a user to customize and enhance the generated optimized flow model.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, assuming a user continues to perform additional processes, then the processor can periodically identify additional processes with a common start event and common sub-processes. The processor may then update the optimized flow model to include any additional transition rules for these common sub-processes.

In some scenarios, the techniques described herein may be implemented in a cloud computing environment. As discussed in more detail below in reference to at least FIGS. 4-7, a computing device configured to automate workflows using structured log events may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
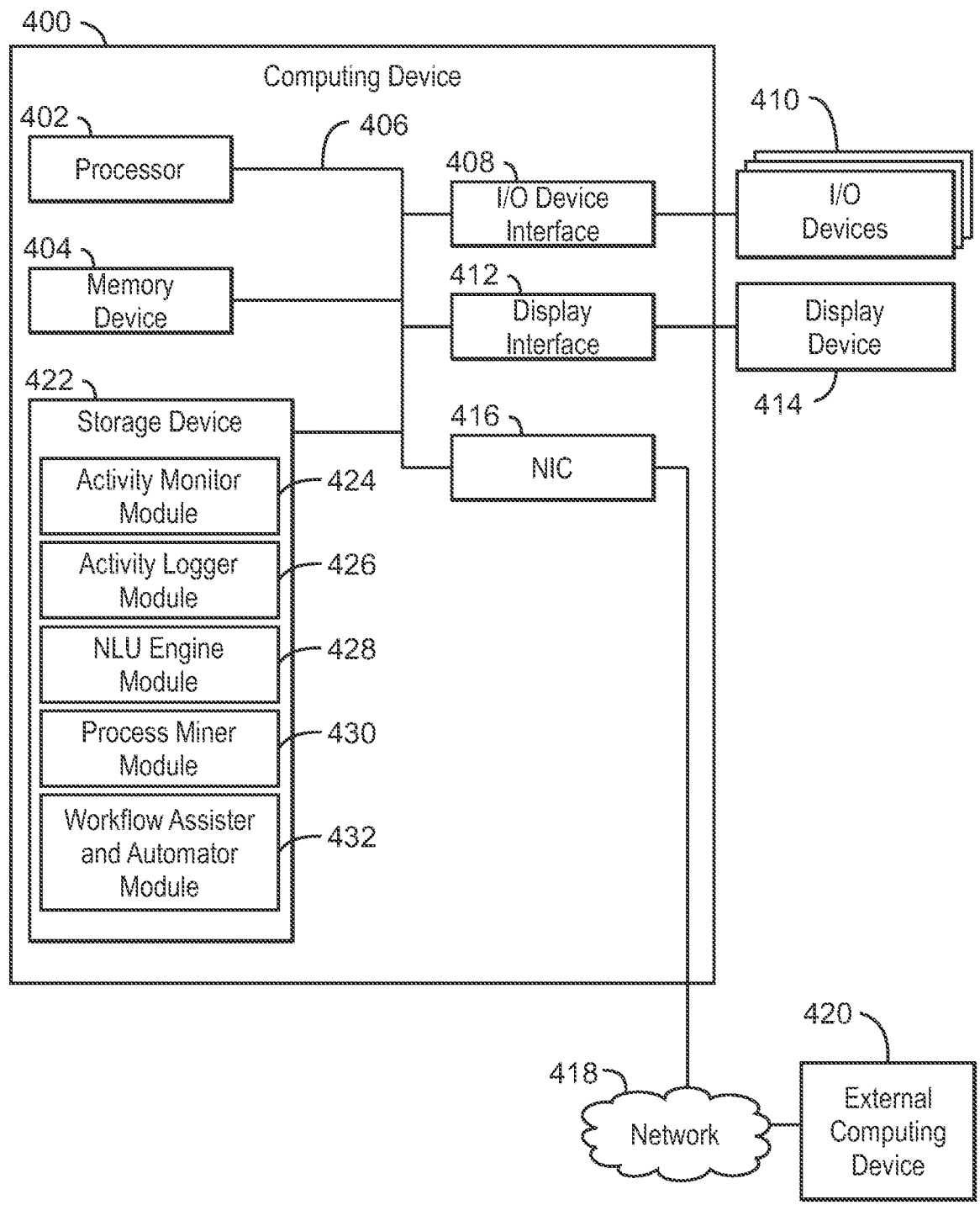
FIG. 4 is a block diagram of an example computing device that can automate and assist workflows using structured log events.

FIG. 4 is block diagram of an example computing device that can automate and assist workflows using structured log events. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include an activity monitor module 424, an activity logger module 426, a natural language understanding (NLU) module 428, a process miner module 430, and a workflow assister and automator module 432. The activity monitor module 424 can monitor a user interface to generate activity logs comprising step-flows. For example, the step-flows may include steps taken by a user to complete a particular task. The activity logger module 426 can store the activity logs in a database. For example, the database can be an internal database or an external database. The NLU module 428 can extract features and common variables from unstructured data in the activity logs and generate structured log events based on the extracted features and the common variables. The process miner module 430 can generate a workflow model based on the structured log events. For example, the process miner module 430 can convert the structured log events to a start event, a step-flow, and an end event. The process miner module 430 can then detect a common start event among monitored processes. The process miner module 430 can also consolidate and optimize the processes based on the common start event. The process miner module 430 can also further detect common sub-processes among the processes. The process miner module 430 can then detect transition rules of each process among the consolidated processes. The process miner module 430 can also execute a classification to detect a context. The process miner module 430 can then generate an optimized flow model based on the starting event, the transition rules, the common sub-processes, and the context. In some examples, the process miner module 430 can adjust the optimized flow model based on user feedback. In some examples, the process miner module 430 can cluster cross-customers and generate an improved workflow to be presented to each customer in the cluster. In various examples, the process miner module 430 can interactively execute a predictive-analytic to suggest a next step for a user-manual-process. The workflow assister and automator module 432 can automate or assist a workflow based on the generated workflow model. For example, the automated or assisted workflow may be security best-practice workflow, a forensic process workflow, system tuning workflow, or a risk mitigation process workflow.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the activity monitor module 424, the activity logger module 426, the NLU module 428, the process miner module 430, and the workflow assister and automator module 432 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of activity monitor module 424, the activity logger module 426, the NLU module 428, the process miner module 430, and the workflow assister and automator module 432 can be implemented with logic, wherein the logic, as referred to herein, can include any suitable hardware (e.g., a processor, among others), software (e.g., an application, among others), firmware, or any suitable combination of hardware, software, and firmware.

Figure 5:
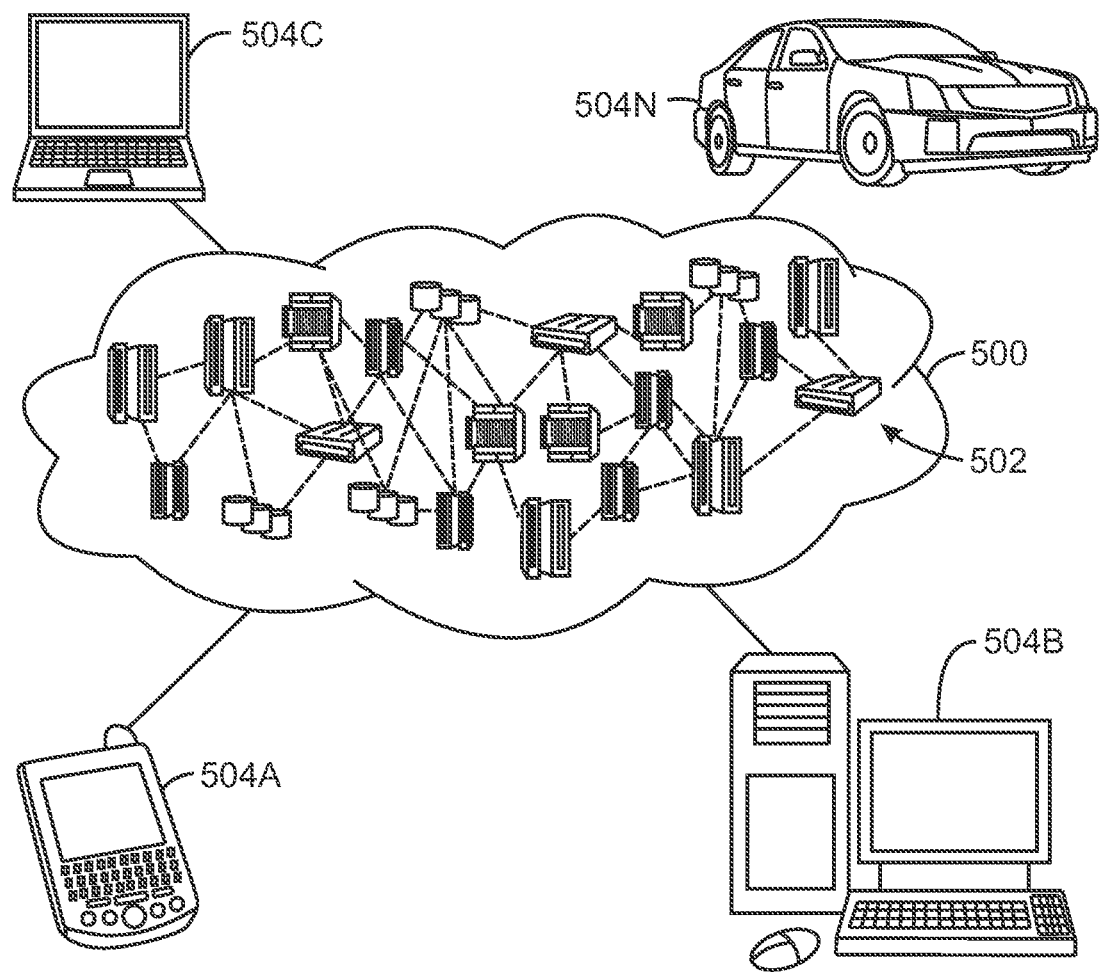
FIG. 5 is a diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
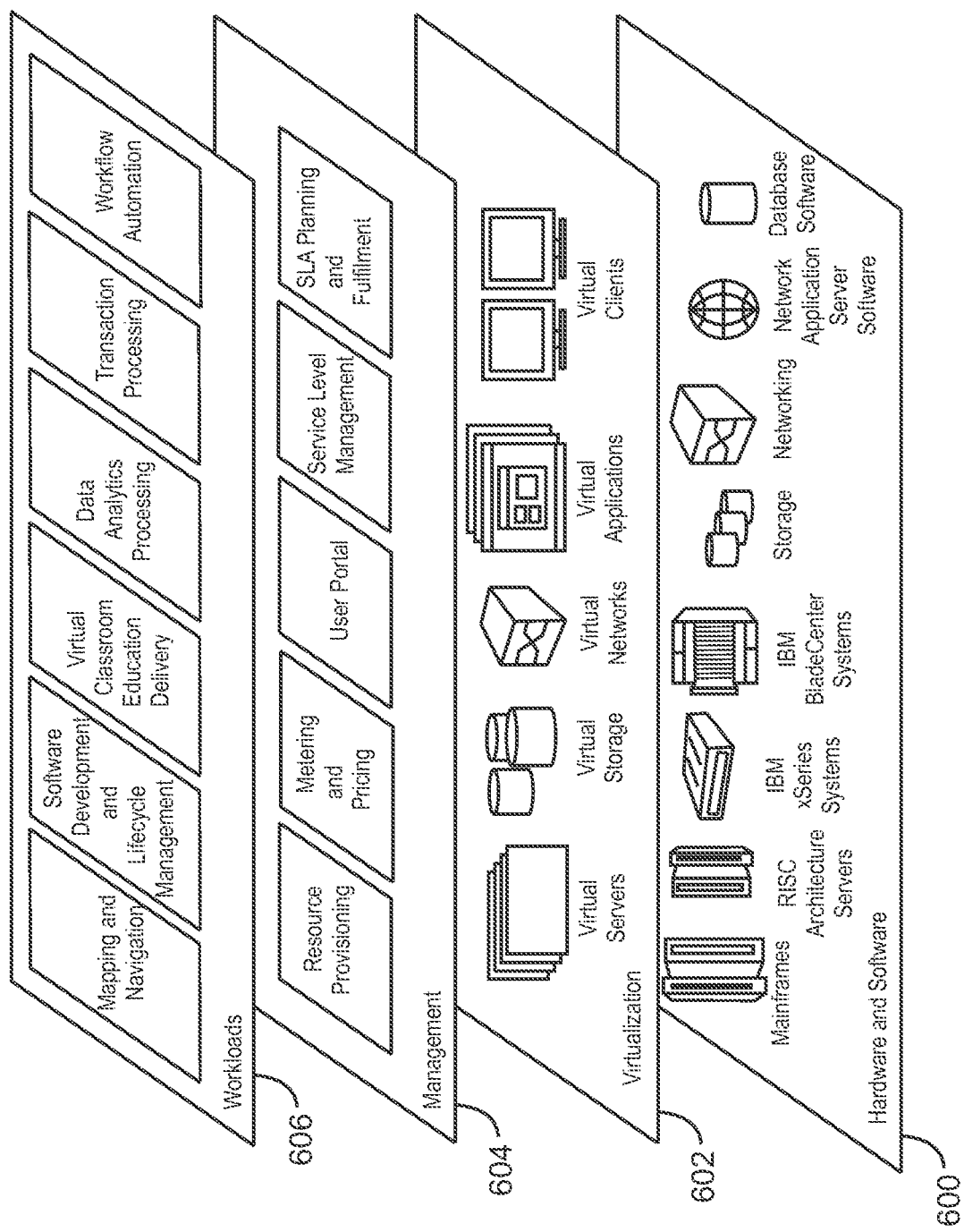
FIG. 6 is a diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workflow automation.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
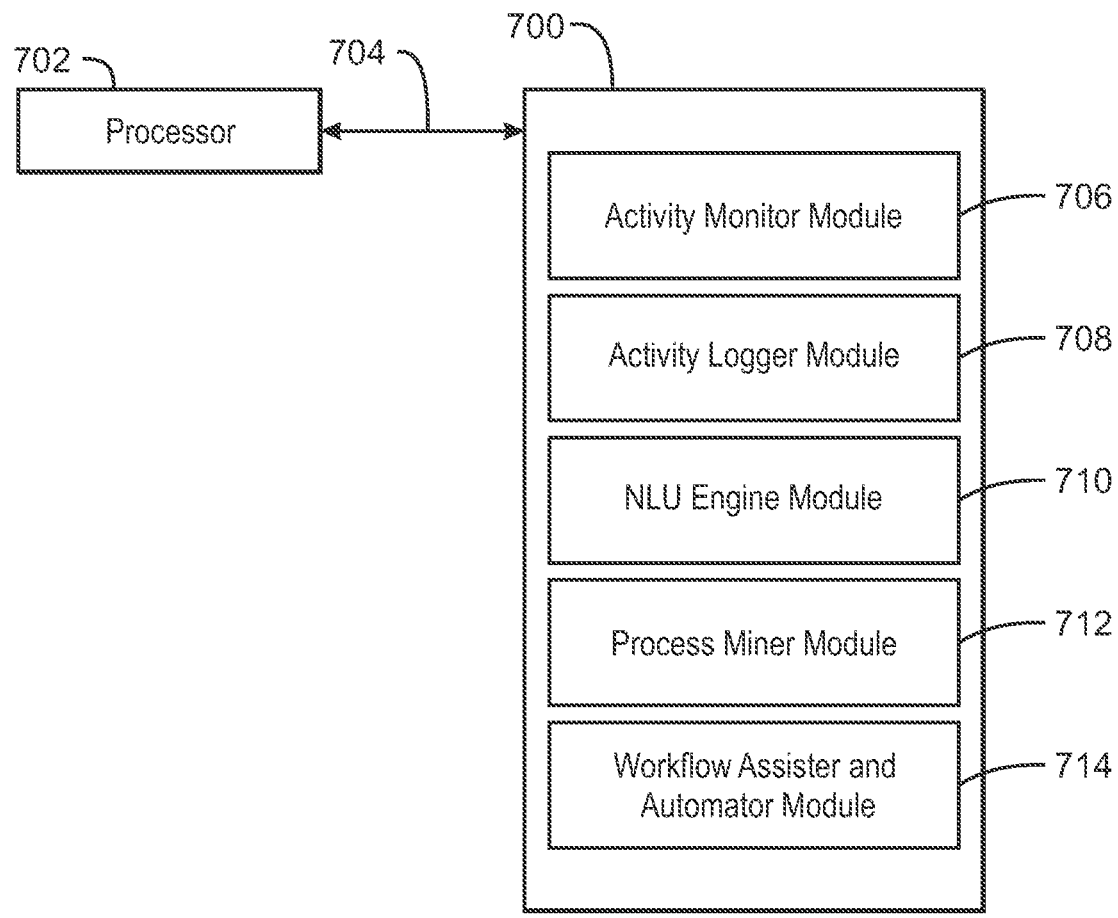
FIG. 7 is an example tangible, non-transitory computer-readable medium that can automate and assist workflows using structured log events.

Referring now to FIG. 7, a block diagram is depicted of an example tangible, non-transitory computer-readable medium 700 that can automate and assist workflows using structured log events. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the methods 200 and 300 of FIGS. 2 and 3.

The various software components discussed herein may be stored on the tangible, non-transitory, computer-readable medium 700, as indicated in FIG. 7. For example, an activity monitor 706 includes code to monitor a user interface to generate activity logs comprising step-flows. A natural language understanding (NLU) module 710 includes code to extract features and common variables from unstructured data in the activity logs and generate structured log events based on the extracted features and the common variables. A process miner module 712 includes code to generate a workflow model based on the structured log events. In some examples, the process miner module 712 includes code to convert the structured log events to a start event, a step-flow, and an end event. In various examples, the process miner module 712 includes code to detect a common start event among monitored processes. The process miner module 712 may also include code to consolidate and optimize the processes based on the common start event. The process miner module 712 may further include code to detect common sub-processes among the consolidated processes. The process miner module 712 may also include code to detect transition rules of each process among the processes. The process miner module 712 may also include code to execute a classification to detect a context. The process miner module 712 may also include code to generate an optimized flow model based on the starting event, the transition rules, the common sub-processes, and the context. In some examples, the process miner module 712 may include code to adjust an optimized flow model based on user feedback. In various examples, the process miner module 712 can also include code to cluster cross-customers and generate an improved workflow to be recommend to each customer in the cluster. A workflow assister and automator module 714 includes code to automate or assist a workflow based on the generated workflow model. In some examples, the workflow assister and automator module 714 includes code to interactively execute a predictive-analytic to suggest a next step for a user-manual-process. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
monitor a user interface to generate activity logs comprising step-flows;
extract features and common variables from unstructured data in the activity logs and generate structured log events based on the extracted features and the common variables;
generate a workflow model based on the structured log events, wherein to generate the workflow model, the processor is to:
detect a common start event among monitored processes;
consolidate and optimize the processes based on the common start event;
detect common sub-processes among the processes;
detect transition rules of each process among the consolidated processes;
execute, via a classifier trained to identify parts of each step in each process that are variable and locations of the parts, a classification to detect a context; and
generate an optimized flow model based on the common start event, the transition rules, the common sub-processes, and the context; and
automate or assist a workflow based on the generated workflow model.

2. The system of claim 1, wherein the structured log events are generated via a natural language understanding unit, wherein the processor is to convert the structured log events to a start event, a step-flow, and an end event.

3. The system of claim 1, wherein the processor is to adjust the optimized flow model based on user feedback.

4. The system of claim 1, wherein the processor is to cluster cross-customers and generate an improved workflow to be presented to each customer in the cluster.

5. The system of claim 1, wherein the processor is to interactively execute a predictive-analytic to suggest a next step for a user-manual-process.

6. The system of claim 1, wherein the automated or assisted workflow comprises a security best-practice workflow, a forensic process workflow, system tuning workflow, or a risk mitigation process workflow.

7. The system of claim 1, wherein the processor is to extract the features and the common variables from the unstructured data in the activity logs via a trained natural language understanding model.

8. A computer-implemented method, comprising:
monitoring, via a processor, a user interface to generate activity logs comprising step-flows;
extracting, via the processor, features and common variables from unstructured data in the activity logs and generate structured log events based on the extracted features and the common variables;
generating, via the processor, a workflow model based on the structured log events, wherein generating the workflow model comprises:
detecting a common start event among monitored processes;
consolidating and optimize the processes based on the common start event;
detecting common sub-processes among the processes;
detecting transition rules of each process among the consolidated processes;
executing, via a classifier trained to identify parts of each step in each process that are variable and locations of the parts, a classification to detect a context; and
generating an optimized flow model based on the common start event, the transition rules, the common sub-processes, and the context; and
automating or assisting, via the processor, a workflow based on the generated workflow model.

9. The computer-implemented method of claim 8, comprising converting the structured log events to a start event, a step-flow, and an end event.

10. The computer-implemented method of claim 8, wherein generating the workflow model comprises adjusting the optimized flow model based on user feedback.

11. The computer-implemented method of claim 8, comprising clustering cross-customers and generate an improved workflow to be recommend to each customer in the cluster.

12. The computer-implemented method of claim 8, comprising interactively executing a predictive-analytic to suggest a next step for a user-manual-process.

13. The computer-implemented method of claim 8, comprising generating additional workflow models based on the structured log events and automatically executing the additional workflow models to generate a plurality of results to be presented.

14. The computer-implemented method of claim 8, wherein the features and the common variables from the unstructured data in the activity logs are extracted via a trained natural language understanding model.

15. A computer program product for automating or assisting workflows, the computer program product comprising a computer-readable storage medium having program code embodied therewith, wherein the computer-readable storage medium is not a transitory signal per se, the program code executable by a processor to cause the processor to:
monitor a user interface to generate activity logs comprising step-flows;
extract features and common variables from unstructured data in the activity logs and generate structured log events based on the extracted features and the common variables;
generate a workflow model based on the structured log events, wherein the processor is to:
detect a common start event among monitored processes;
consolidate and optimize the processes based on the common start event;
detect common sub-processes among the consolidated processes;
detect transition rules of each process among the processes;
execute, via a classifier trained to identify parts of each step in each process that are variable and locations of the parts, a classification to detect a context; and generate an optimized flow model based on the common start event, the transition rules, the common sub-processes, and the context; and automate or assist a workflow based on the generated workflow model.

16. The computer program product of claim 15, further comprising program code executable by the processor to convert the structured log events to a start event, a step-flow, and an end event.

17. The computer program product of claim 15, further comprising program code executable by the processor to adjust the optimized flow model based on user feedback.

18. The computer program product of claim 15, further comprising program code executable by the processor to cluster cross-customers and generate an improved workflow to be recommend to each customer in the cluster.

19. The computer program product of claim 15, further comprising program code executable by the processor to interactively execute a predictive-analytic to suggest a next step for a user-manual-process.

20. The computer program product of claim 15, wherein the features and the common variables from the unstructured data in the activity logs are extracted via a trained natural language understanding model.

* * * * *